(12) United States Patent
Owlia

(10) Patent No.: US 11,560,822 B2
(45) Date of Patent: Jan. 24, 2023

(54) PARTICULATE FILTER SOOT MANAGEMENT FOR INTERNAL COMBUSTION ENGINES

(71) Applicant: Tula Technology, Inc., San Jose, CA (US)

(72) Inventor: Shahaboddin Owlia, Royal Oak, MI (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/002,509

(22) Filed: Aug. 25, 2020

(65) Prior Publication Data

US 2022/0065151 A1   Mar. 3, 2022

(51) Int. Cl.
| | | |
|---|---|---|
| *F01N 9/00* | (2006.01) | |
| *F02D 13/06* | (2006.01) | |
| *F02D 41/02* | (2006.01) | |
| *F01N 3/021* | (2006.01) | |

(52) U.S. Cl.
CPC ............. *F01N 9/002* (2013.01); *F01N 3/021* (2013.01); *F02D 13/06* (2013.01); *F02D 41/029* (2013.01); *F01N 2900/1602* (2013.01); *F01N 2900/1606* (2013.01); *F02D 2200/0802* (2013.01); *F02D 2200/0812* (2013.01)

(58) Field of Classification Search
CPC .. F01N 9/002; F01N 3/021; F01N 2900/1602; F01N 2900/1606; F01N 2560/06; F01N 2560/14; F01N 2900/1402; F01N 2900/1611; F01N 3/2066; F02D 13/06; F02D 41/029; F02D 2200/0802; F02D 2200/0812; F02D 41/0007; F02D 41/005; F02D 41/0087

USPC .......................................................... 60/274
See application file for complete search history.

(56) References Cited

U.S. PATENT DOCUMENTS

| | | | |
|---|---|---|---|
| 8,151,557 B2 * | 4/2012 | Gonze | F02D 41/0002 60/295 |
| 10,247,072 B2 | 4/2019 | Younkins et al. | |
| 10,927,780 B2 | 2/2021 | Srinivasan | |
| 2003/0121249 A1 * | 7/2003 | Foster | B60H 1/12 60/285 |
| 2010/0186384 A1 | 7/2010 | Gonze et al. | |
| 2012/0102920 A1 * | 5/2012 | Pipis, Jr. | F01N 3/103 60/274 |
| 2013/0061573 A1 * | 3/2013 | In | F02D 41/0087 60/274 |
| 2015/0135680 A1 * | 5/2015 | Ancimer | F02D 41/029 60/274 |

(Continued)

OTHER PUBLICATIONS

International Search Report and Written Opinion from related PCT Application No. PCT/US2021/043912, dated Nov. 15, 2021, 18 pages.

*Primary Examiner* — Anthony Ayala Delgado
(74) *Attorney, Agent, or Firm* — Brooks, Cameron & Huebsch, PLLC

(57) ABSTRACT

Methods, systems, and devices for particulate filter soot management for internal combustion engines are described herein. A method for particulate filter soot management for internal combustion engines includes determining a quantity of soot on a particulate filter and adjusting a skip fire firing sequence based at least in part on maintaining the quantity of soot on the particulate filter within a desired soot quantity range.

12 Claims, 9 Drawing Sheets

(56) References Cited

U.S. PATENT DOCUMENTS

| | | |
|---|---|---|
| 2015/0354484 A1 | 12/2015 | Zur Loye et al. |
| 2016/0115878 A1 | 4/2016 | VanDerWege |
| 2016/0115884 A1 | 4/2016 | VanDerWege et al. |
| 2016/0123200 A1* | 5/2016 | Ramappan .............. F02D 37/02 60/285 |
| 2017/0130630 A1* | 5/2017 | Younkins .............. F01N 11/005 |
| 2019/0178135 A1 | 6/2019 | Younkins et al. |
| 2021/0025342 A1* | 1/2021 | Charbonnel .......... F02D 41/029 |

* cited by examiner

PARTICULATE FILTER SOOT MANAGEMENT FOR INTERNAL COMBUSTION ENGINES

TECHNICAL FIELD

The present disclosure relates to combustion engine management methods, devices, and systems and, in particular, to soot management methods, devices, and systems for combustion engines.

BACKGROUND

Spark ignition and compression ignition engines require an exhaust system including one or more aftertreatment elements to limit emission of undesirable pollutants that are combustion byproducts. Catalytic converters and particulate filters are two common aftertreatment elements.

Spark ignition engines generally use a 3-way catalyst that both oxidizes unburned hydrocarbons and carbon monoxide and reduces nitrous oxides (NOx). These catalysts require that, on average, the engine combustions be at or near a stoichiometric air/fuel ratio, so that both oxidation and reduction reactions can occur in the catalytic converter.

Since compression ignition engines generally run lean, they cannot rely solely on a conventional 3-way catalyst to meet emissions regulations. Instead they use another type of aftertreatment device to reduce NOx emissions. These aftertreatment devices may use catalysts, lean NOx traps, and selective catalyst reduction (SCR) to reduce nitrous oxides to molecular nitrogen. The most common SCR system adds a urea/water mixture to the engine exhaust prior to the engine exhaust flowing through a SCR based catalytic converter. In the SCR element the urea breaks down into ammonia, which reacts with nitrous oxides in the SCR to form molecular nitrogen (N2) and water (H2O).

Soot and ash are other byproducts that exit an internal combustion engine (both spark ignition and compression ignition), they are generally viewed as non-beneficial and harmful to the environment. All internal combustion engines produce an amount of soot and ash as byproducts of the combustion process.

Soot is made up of mostly combustible material that can be oxidized to make its particles smaller and less impactful. Ash is made up of non-combustible materials and, so for treatment of ash, exhaust systems may be utilized to attempt to capture ash within the system.

One mechanism used in the ash and soot removal/conversion process is a particulate filter. The filter exhaust gas to pass through a porous filter material and, in doing so, larger particulate, such as larger soot and ash particles, cannot pass through the pores and are captured by the filter material. As more, larger particles are caught in and on the filter material, they begin to further restrict the pore size and, thereby, smaller and smaller sized soot particles are captured by the filter material.

This can be beneficial to the filtering process, to a point. Over time, the particles will continue to collect in and on the filter material until the pores are nearly or completely blocked, allowing very few or no particles through. Accordingly, with many of the pores blocked, the gas flow through the filter material decreases. This restriction reduces the performance and fuel economy of the engine, among other issues.

DETAILED DESCRIPTION

Figure 1A:
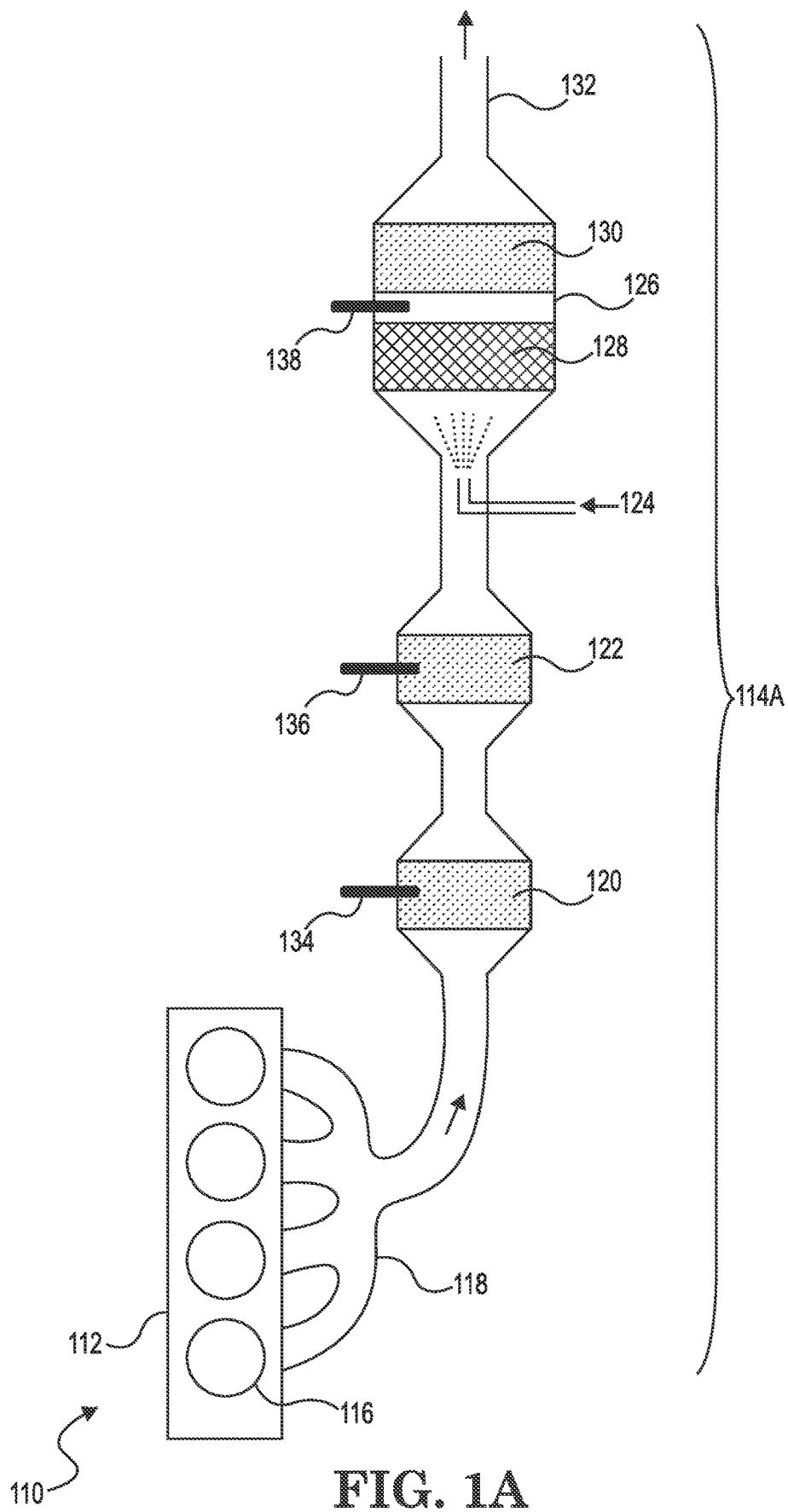
FIG. 1A is a schematic diagram of a representative engine exhaust system for an internal combustion engine for use with embodiments of the present disclosure.

As discussed above, methods, systems, and devices for particulate filter soot management for internal combustion engines are described herein. Such embodiments can determine a quantity of soot on a particulate filter and adjust a skip fire firing sequence based at least in part on maintaining the quantity of soot on the particulate filter to improve the filtering efficiency of the particulate filter, among other benefits, as described in more detail below.

For example, in one embodiment, a method for particulate filter soot management for internal combustion engines includes determining a quantity of soot on a particulate filter and adjusting a skip fire firing sequence based at least in part on maintaining the quantity of soot on the particulate filter within a desired soot quantity range. The engine may be either a spark ignition or compression ignition engine. The internal combustion engine may, for example, be used to power a vehicle.

In internal combustion engines that are operated close to stoichiometry, the exhaust temperature is typically hot enough that soot is oxidized during deceleration fuel-cut events. As a result, particulates do not accumulate substantially in the particulate filter. The lack of particulate build up, allows smaller particulates to flow through the filter. This means that some soot exits the exhaust system as waste which has a negative impact on emissions from the vehicle. Governments have begun to limit the amount of particulate that can be emitted from the exhaust system of vehicle and, therefore, it is beneficial to capture more particulate within the exhaust system. With virtually no soot collecting in the particulate filter, the pores of the filter material allow some of the particulate to pass through the filter.

Compression ignition engines run cooler and lots of particulate settles in the particulate filter. This can cause problems with back pressure building up in the exhaust system and, potentially in the engine, which can cause reduced fuel economy and limitations in the performance the engine can deliver, among other problems.

However, embodiments of the present disclosure allow a quantity of soot to be maintained at a desired quantity in the particulate filter, thereby, making the filter more efficient at capturing particulate for both spark ignition and compression engines, among other benefits. This can be accomplished, for example, by utilizing skip fire technology to adjust the exhaust gas temperature to build up or reduce soot quantity to within a desired range and maintain it within that range.

Skip Fire Engine Control

Skip fire engine control contemplates selectively skipping the firing of certain cylinders during selected firing opportunities. Thus, for a given effective engine displacement that is less than the full displacement of the engine, a particular cylinder may be successively fired during one firing opportunity, skipped during the next firing opportunity, and then selectively skipped or fired during the next firing opportunity.

The firing sequence may be expressed as a firing density, which indicates a ratio of fired firing opportunities to total firing opportunities. Firing density may be expressed as a fraction, a percentage, or in some other manner. With skip fire, much finer engine control is possible than by using only a fixed set of deactivated cylinders, although, some embodiments may also work with a deactivated cylinder arrangement.

During normal driving, an engine typically must operate over a wide range of engine speeds and engine loads. To meet these changing operating conditions, a skip fire controlled engine may transition between various firing densities. For instance, a commercially available skip fire controller that provides for seventeen (17) different firing densities, each indicative of a different reduced effective engine displacement, is available.

In contrast, with conventional variable displacement, a set of one or more cylinders are continuously fired, while a second set of one or more different cylinders are continually deactivated or skipped. For example, an 8-cylinder variable displacement engine may deactivate blocks of cylinders (i.e., 2, 4, or 6 cylinders) so that it is operating using only the remaining (i.e., 6, 4, or 2) cylinders. With significantly more firing densities available, skip fire offers significantly more refined engine control compared to conventional displacement engine control.

Dynamic Skip Fire (DSF) Engine Control

Further, with certain implementations of skip fire engine control, a decision to fire or not fire a given cylinder of an engine is made dynamically, meaning on a firing opportunity-by-firing opportunity basis. In other words, prior to each successive firing opportunity, a decision is made to either fire or skip the firing opportunity. In various embodiments, the firing sequence is determined on a firing opportunity by firing opportunity basis by using a sigma delta, or equivalently a delta sigma, converter. Such a skip fire control system may be defined as dynamic skip fire control. For more details on DSF, see U.S. Pat. Nos. 7,849,835, 9,086,020 and 9,200,575, and U.S. patent application Ser. No. 14/638,908, each incorporated by reference herein for all purposes.

Skip fire engine control, including DSF, can offer various advantages, including substantial improvements in fuel economy for spark ignition engines where pumping losses may be reduced by operating at higher average manifold absolute pressure (MAP) levels. With compression ignition engines, skip fire control provides a means to control the engine exhaust gas temperature over a wide range of engine operating conditions.

In particular, skip fire control may be used to modulate exhaust gas temperatures within a range where aftertreatment emission control systems can efficiently reduce tailpipe emissions. Various approaches of this kind are described in co-assigned U.S. patent application Ser. No. 15/347,562, which is incorporated herein in its entirety for all purposes. Use of skip fire control can also offer greater than a twenty percent (20%) improvement in efficiency in compression ignition engines at light loads, for example, loads less than 10% of the engine's maximum output. As discussed herein, skip fire technology is one way in which filter soot quantity can be managed.

One other concept that will be helpful to the reader to understand before discussing the embodiments of the present disclosure is how the use of Deceleration Fuel Cut Off (DFCO) and Deceleration Cylinder Cut Off (DCCO) in engines effects engine performance and soot accumulation. Many vehicle engines today utilize DFCO to improve fuel economy, as DFCO interrupts supply of fuel to the cylinders of the engine when the car is decelerating (when the driver lifts their foot off the accelerator pedal, called a "lift off" event). Traditionally, before DFCO was implemented, the engine would continue to burn fuel during deceleration, as such DFCO can provide a modest fuel savings.

With DFCO, the valves continue to operate and allow air to pass through the cylinders and into the exhaust system. The air provides increased oxygen which can be used to oxidize the soot in the particulate filter. Also, the flow of exhaust gas slows as there is no combustion happening to push the exhaust gas through the exhaust system, so there is more time for the oxygen to be used to oxidize the soot and burn it off. Accordingly, for vehicles using DFCO, very little soot is likely to accumulate in the particulate filter as the DFCO process oxidizes the soot and it is burned off.

However, embodiments of the present disclosure utilize a transition from DFCO to DCCO or use of DCCO instead of DFCO, which will allow for the maintaining of a quantity of soot in the particulate filter. This is because, with DCCO the cylinders of the engine are cut off meaning that the valves are closed and no fuel is injected into the cylinders to be combusted and no air is passed through the cylinders into the exhaust system. In this manner, there is no influx of oxygen to aid in the oxidization of the soot and, therefore, the soot can accumulate in the particulate filter.

DCCO can be accomplished using the skip fire technology discussed above. Used in place of DFCO, DCCO can also be beneficial with regard to fuel savings. The concepts of DFCO and DCCO will be discussed in more detail below.

In the following detailed description, reference is made to the accompanying drawings that form a part hereof. The drawings show, by way of illustration, how one or more embodiments of the present disclosure may be practiced.

These embodiments are described in sufficient detail to enable those of ordinary skill in the art to practice one or more embodiments of the present disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 20 may reference element "120" in FIG. 1A, and a similar element may be referenced as 220 in FIG. 2A.

As used herein, "a" or "a number of" something can refer to one or more such things. For example, "a number of valves" can refer to one or more valves. As used herein, "a plurality of" means two or more things.

Example Exhaust System for an Internal Combustion Engine

FIG. 1A is a schematic diagram of a representative engine exhaust system for an internal combustion engine for use with embodiments of the present disclosure. The engine 112 of the engine and exhaust system 110 includes a plurality of cylinders 116 where combustion occurs.

In the embodiment shown, the engine 112 includes four (4) cylinders 116. It should be understood that the engine 112, as illustrated, is merely an example and engines used with embodiments of the present disclosure may include fewer or more cylinders 116.

In addition, the engine 112 can, for example, be a compression ignition or a spark ignition (SI) engine. For the sake of simplicity, the discussion below of the operation of the engine 112 is largely within the context of a spark ignition engine. It should be understood, however, that many of the features discussed below are equally applicable to other types of engines, such as compression ignition engines.

During operation of the engine 112, exhaust gases from the combustion process exit the cylinders 116 and are vented to the exhaust system 114A by way of an exhaust manifold 118.

The exhaust system 114A includes one or more aftertreatment elements to reduce emission of noxious material into the environment. These elements may include one or more of: (a) an oxidizing catalytic converter 122, (b) a particulate filter 120, (c) a reduction agent injection system 124, (d) a reducing catalytic converter 126, and/or a device that provides a combination of one or more of these elements, such as a three-way catalyst that oxidizes and reduces emission of noxious material or a four-way catalyst that reduces, oxides, and filters noxious material. Collectively, these various aftertreatment elements or devices are often referred to as the aftertreatment system 114A.

The oxidizing catalytic converter 122 oxidizes unburned hydrocarbons and carbon monoxide that were not burned during the combustion process and have moved into the exhaust stream. The particulate filter 120 removes particulate matter, i.e., soot and ash, which may be present in the exhaust stream. The reduction agent injection system 124 introduces a reducing agent, often a mixture of urea and water, into the exhaust stream.

The reducing catalytic converter 126 may use selective catalytic reduction (SCR) to reduce nitrous oxides to molecular nitrogen and water. The reducing catalytic converter 126 may use two catalysts. A first catalyst 128 transforms urea introduced by the reducing agent 124 to ammonia and transforms nitrous oxides and ammonia into molecular nitrogen and water. A second catalyst 130 utilizes excess ammonia, which may slip through the first catalyst 128, to continue to reduce residual NON. After passing through the reducing catalytic converter 126, the exhaust stream leaves the exhaust system 114A via tailpipe 132 and goes into the environment.

The aforementioned aftertreatment elements in the exhaust system 114A are sufficient to remove noxious pollutants from the exhaust stream in compliance with current environmental regulations. To the extent a further reduction in pollutants is desired, or environmental regulations become more stringent, additional elements can be added to the exhaust system 114A without departing from the embodiments of the present disclosure as described herein.

The exhaust system 114A may additionally include one or more sensors. For example, sensors may include (a) a temperature sensor 134 to monitor the temperature of the particulate filter 120 or exhaust gas in the filter or in the aftertreatment chamber housing the filter, (b) a temperature sensor 136 to monitor the temperature of oxidizing catalytic converter 122, and/or (c) a temperature sensor 138 to monitor the temperature of the reducing catalytic converter 126, among other sensors.

The arrangement of the exhaust system of 114A may be advantageous when the quantity of particulate in filter 120 needs to be adjusted. For example, by positioning the oxidizing catalytic converter 122 upstream from the particulate filter 120, the temperature within the particulate filter 120 may be actively controlled, which may produce differing amounts of heat based on materials being oxidized in the oxidizing catalytic converter 122.

Figure 1B:
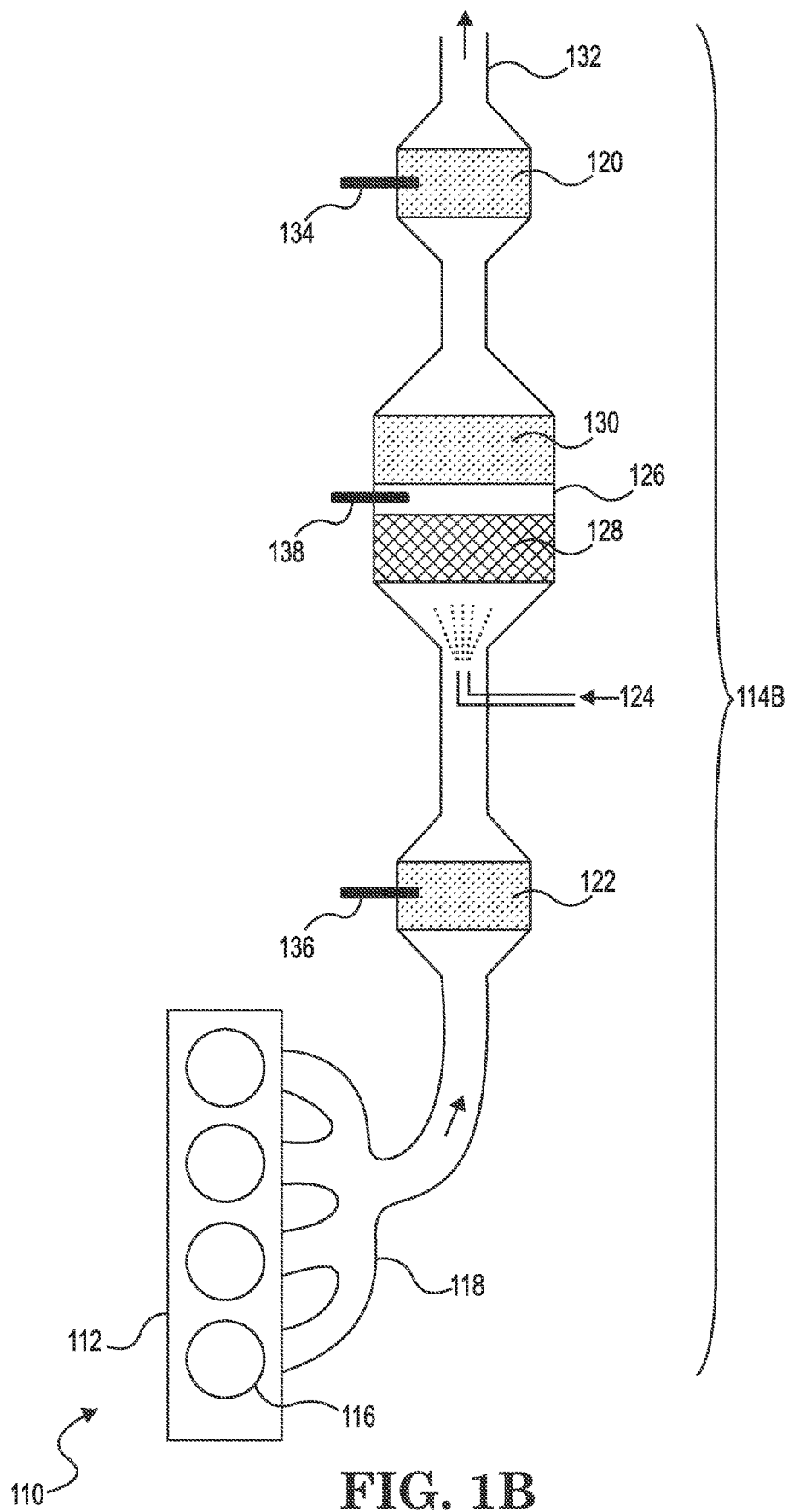
FIG. 1B is a schematic diagram of an alternative representative engine exhaust system for an internal combustion engine for use with embodiments of the present disclosure.

Referring to FIG. 1B, a system 110 including an engine 112 and an alternative representative exhaust system 114B is shown. With this arrangement, the particulate filter 120 is placed downstream of the reducing catalytic converter 126. Otherwise, the exhaust systems 114A and 114B are essentially the same.

The order of the various aftertreatment elements described herein, as well as additional aftertreatment elements that may be used, may widely vary to meet operating conditions, regulatory requirements, and/or other objectives. Accordingly, should be noted that the particular order of the various aftertreatment elements shown in FIG. 1A and FIG. 1B are merely examples and should not be construed as limiting.

It also should be noted that the exhaust systems 114A and 114B may also include other types of sensors besides temperature sensors. For example, sensor 134 can be a pressure sensor (e.g., measuring the difference (delta) in pressure between a pressure upstream of the porous material of the filter and a pressure downstream of the porous material of the filter) in the aftertreatment chamber where the particulate filter resides and/or within the particulate filter. As used herein, upstream means closer to the engine and downstream means closer to the tail pipe. Other sensor types can include oxygen sensors, for example, placed before and after the oxidizing catalytic converter 122, and/or a $NO_x$ sensor, for example, situated downstream from the reducing catalytic converter 126.

It should further be noted that various other features and elements not shown in FIGS. 1A and 1B may be situated between the engine and the aftertreatment elements of exhaust systems 114A and 114B. Such elements may include, but are not limited to, an exhaust gas recirculation system (EGR), a turbine to power a turbocharger, and a waste gate to control exhaust gas flow through the turbine, among other features and elements.

Example of a Particulate Filter

Figure 2A:
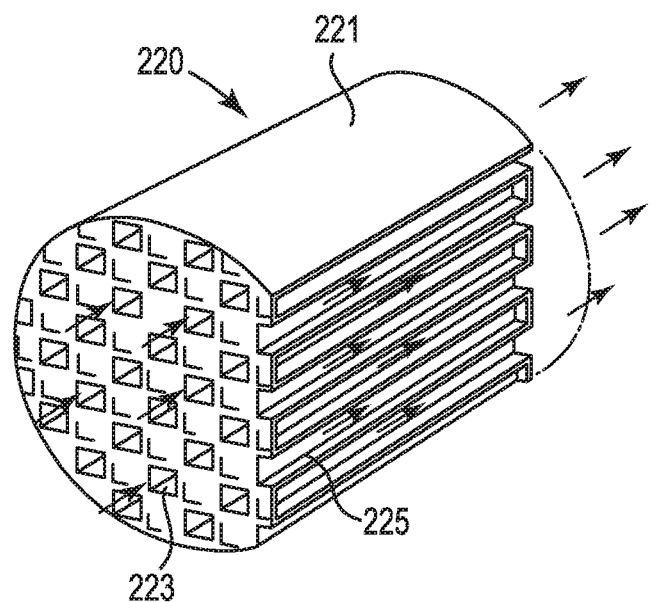
FIG. 2A is an angled perspective view of a particulate filter that may be used with embodiments of the present disclosure.
Figure 2B:
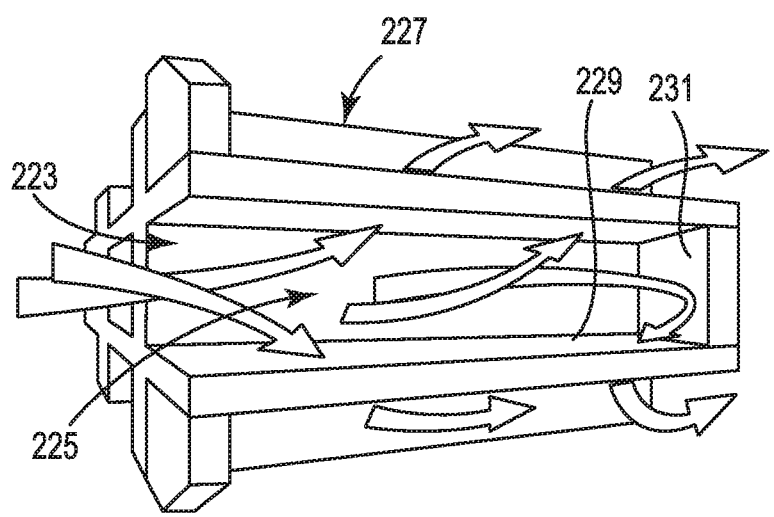
FIG. 2B is an enlarged view of the interior of a portion of the particulate filter of FIG. 2A that may be used with embodiments of the present disclosure.

FIG. 2A is an angled perspective view of a particulate filter that may be used with embodiments of the present disclosure. FIG. 2B is an enlarged view of the interior of a portion of the particulate filter of FIG. 2A that may be used with embodiments of the present disclosure.

The particulate filter 220 in FIGS. 2A and 2B has a front face with a plurality of openings 223 that allow exhaust gas to pass into the filter body 221. Within the filter body are a plurality of channels 225. Some of the channels, such as channel 225, allow the exhaust gas to flow through the opening 223 and into the channel 225. These channels have an end wall 231 that blocks the flow of the exhaust and forces it to pass through the sides 229 of the chamber 225 and into a neighboring channel 227 that does not have an end wall and thereby allows the exhaust gas to leave the particulate filter 220 through the open end. The sides 229 are porous and act to filter soot and ash particles out of the exhaust gas as it passes from the chamber 225 through the side 229 and into chamber 227.

Pores act as tunnels through the side 229 between channel 225 and channel 227. They can vary in diameter along their extent. Depending on the diameter and shape of the soot or ash particles, the particles will either pass through the pores, e.g., if the particles are smaller in diameter than the smallest diameter of the pore, (b) travel into the pore but get stuck, e.g., if the particle is smaller in diameter than the inlet of the pore but larger in diameter than a diameter of a portion of the pore within the side, or (c) accumulate on the surface of the side 229 that forms a wall of the chamber 225, e.g., if the particle is larger in diameter than the diameter of the opening to the pore.

As soot is a combustible material, it can be oxidized to reduce the size of the particles or to allow it to be broken into smaller particles, thereby allowing it to pass through the pores more readily. This can occur when the exhaust gas temperature is elevated to a temperature conducive to burning soot (e.g., 500 to 600° C.).

Ash, as mentioned above, is non-combustible and, therefore, cannot be removed in the same manner. If ash enters the pores and gets stuck, it cannot be removed. Accordingly, it is preferable to have some soot in the pores of the filter and, also, on the surface of the walls of the chamber 225. In this manner, the ash does not enter the pores.

Further, when desired, the system can initiate a process (e.g., during DFCO) where the quantity of the soot is reduced and, in performing this operation, the ash can be pushed to the surface of the end wall 231 via the flow of the exhaust gas through the chamber, where it will no longer be able to move into the pores. This allows the ash to be captured and stored in the filter but does not substantially affect the exhaust gas flow through the filter.

As a result, the pressure drop across the particulate filter will not dramatically change as the exhaust system ages, potentially requiring a filter replacement.

One way to generate more soot is to change the injection timing such that the fuel-air mixture in the cylinder is not homogeneously mixed (e.g., the mixture can be stratified). In such an implementation, the areas of the mixture that are richer will create soot. Another method is to run the engine rich. Lowering fuel rail pressure is another means of creating a less homogenous mix which generates soot.

Such modes are not helpful in reducing emissions of the engine in the short term. However, using such modes will deposit soot in the particulate filter which will increase the filter's ability to capture soot particles (i.e., increase its efficiency), thereby reducing emissions in the long term, as will be discussed in more detail with respect to the data provided in FIG. 7. It should be understood by the reader that these methods can be used to create soot, for building up the quantity of soot, generally.

Further, such a mode will also keep ash from fouling the filter, which will extend the life of the filter and reduce wear on components of the exhaust system and/or engine and reduce potential engine performance issues due to high back pressure, which occurs when the filter becomes clogged with particulate or when the quantity of soot or ash in the filter is too great.

Although the term "quantity of soot" is used herein, it should be understood that the materials coating the surfaces of and in the pores of the particulate filter may also contain ash and that pressure measurements and modeling regarding maintaining a soot quantity take into account that a certain amount of ash is present in the filter.

Estimating a desired soot quantity and soot loading rates can be accomplished in any suitable manner. For example, a particulate filter can be weighed before use. It can then be installed in an exhaust system and the engine, connected to the exhaust system, can be run for a period of time. The filter can then be removed and weighed again to determine soot loading rate over time.

The pressure at the particulate filter can also be monitored during such testing and so a rate of change of the pressure can, for instance, be determined as well as pressure values for different soot quantities can be determined. Similarly, exhaust gas temperature, exhaust gas flow, and oxygen concentration, among other engine/exhaust system characteristics, can be monitored and/or periodically checked during the testing to correlate values for those characteristics with soot quantity values. The filter can also be analyzed to determine the amount of ash that has accumulated and the rate of ash loading during such testing.

As discussed, this data can then be used by an engine controller, for example. For instance, such data can be used to determine the engine adjustments for managing a soot quantity in a particulate filter.

The desired range of soot quantity in the particulate filter is dependent on several factors and, as such, each engine/exhaust system variety will likely have a different desired range of soot quantity. For example, soot loading (i.e., depositing of a quantity of soot in the filter) can be modeled based on the following factors: engine soot output (some engines produce less soot than others), engine operational parameters (e.g., speed, load, injection timing, air-fuel ratio, cylinder temperature, fuel rail pressure), current filtration efficiency (the more efficient the filter, the less soot loading is needed to improve filter efficiency to a desired efficiency level), and the burn rate of the particulate (example exhaust conditions that can effect the burn rate include, type of particulate, exhaust temperature, exhaust flow, and oxygen concentration). The current filtration efficiency can also be affected by current soot and ash quantity at the filter, the rate of change of the soot quantity over time, and the oxygen concentration in the exhaust gas.

The above criteria can, for example, be sensed by one or more sensors at the engine or exhaust system. Such criteria can also be modeled through testing and the modeled data can then be used, by itself or in combination with sensor data, to determine the desired range of soot quantity, as discussed herein.

Further, a desired range of soot quantity can be different depending on the function of the soot quantity in the particulate filter. For example, one desired range may be suitable when the system is addressing ash mitigation and another desired range may be suitable when using the soot quantity to effect filter efficiency. Additionally, in some implementations both functions may be important and, therefore, a range that is desirable for both functions can be used.

The soot quantity (typically quantified in grams/liter) can be measured in any suitable manner. Alternatively, rather than directly measuring the quantity of soot, a pressure measurement can be used to determine whether the quantity of soot in the particulate filter is too much, just the right amount, or too little soot. For example, a difference in pressure (delta between the pressure upstream of the porous material in the particulate filter versus downstream of the porous material) can be monitored periodically over time.

This data can be used to determine, for instance, the rate at which the soot quantity is increasing or decreasing in the filter which can be utilized, for example, to determine when an increase or decrease in the soot quantity should be initiated to maintain the soot quantity within the desired range.

Additionally, in some embodiments, the soot quantity management system can be tested to make sure that the correct quantity of soot and other criteria for soot build up or reduction are being measured or estimated properly. For example, the system can build up soot under a set of specific parameters (e.g., engine load, injection timing, oxygen concentration) and then pressure data can be obtained to confirm that the expected soot quantity is actually in the particulate filter. Based on such testing, the parameters can be adjusted in the instructions at the engine controller to bring the estimate and the actual soot quantity generation into agreement. Such testing could, for example, be done periodically by the engine controller during normal operation of the engine.

As discussed above, an adjustable exhaust temperature and/or oxygen level can be beneficial in building and reducing the soot quantity at the particulate filter.

Exhaust System Operating Temperatures

Figure 3:
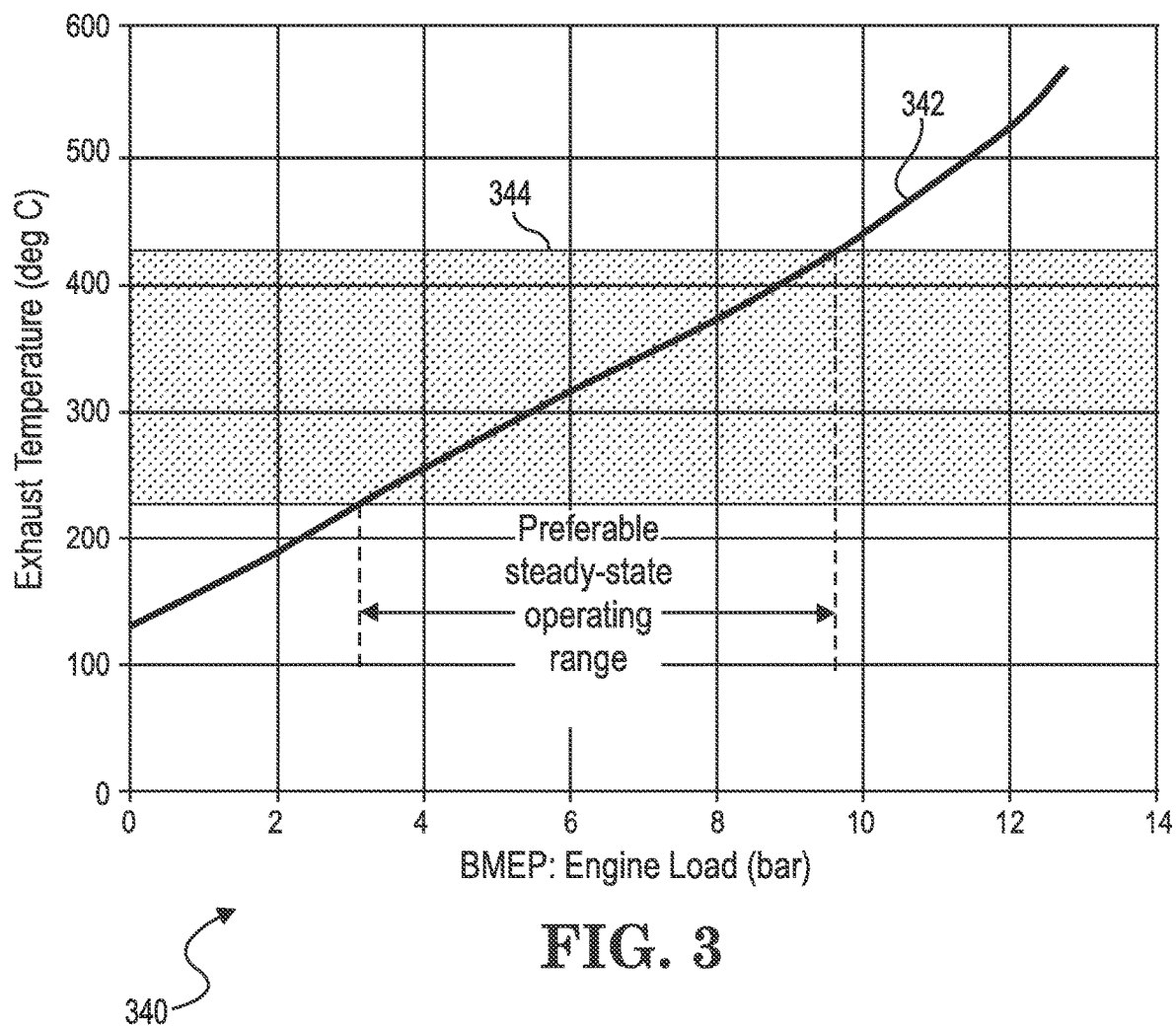
FIG. 3 is a plot of exhaust gas temperature versus engine load for an internal combustion engine that may be used with embodiments of the present disclosure.

Referring to FIG. 3, a plot of exhaust gas temperature versus engine load for an internal combustion engine that may be used with embodiments of the present disclosure is illustrated. In this example, the parameters of the illustrated engine were, a boosted, compression-ignition, engine operating at 1250 rpm.

With reference to FIGS. 1A and 1B, the exhaust stream will generally be at its hottest temperature as it passes from the engine 112 through the exhaust manifold 118. As the exhaust stream passes through the subsequent elements of the exhaust system 114A/114B, the gases tend to cool from one stage to the next. The aftertreatment elements 120, 122, and 126 are, therefore, typically arranged in the order requiring the highest to lowest operating temperatures.

For example, the exhaust gases passing through the oxidizing catalytic converter 122 are hotter than that passing through to the downstream elements 120 and 126 in FIG. 1A. In the arrangement of FIG. 1B the gasses passing through the reducing catalytic converter 126 are hotter than that of the downstream particulate filter 120. It should be appreciated that exothermic chemical reactions may occur in any aftertreatment element, which may raise the temperature of the aftertreatment element and any other downstream elements.

In order for some of the aftertreatment devices in systems 114A and 114B to properly function, the elements 120, 122, and 126 each need to operate within a specified elevated temperature range. In some embodiments, the representative operating range for the reducing catalyst 126 is in the approximate range of 200° to 400° C.

In the example plot 340 of FIG. 3, the curve 342 represents the exhaust gas temperature as a function of engine load expressed in Brake Mean Effective Pressure (BMEP) for the case where all engine cylinders are firing under substantially the same conditions.

The operating range 344 is the temperature range of the exhaust gases in the exhaust manifold (e.g., manifold 118 of FIG. 1A). In this particular example, the operating range is approximately 225° to 425° C.

Exhaust gases will typically cool somewhat at each stage of either aftertreatment system 114A/114B. For example, by the time the exhaust gases reach the reducing catalytic converters 128, 130 of the reducing catalytic converter 126 in aftertreatment system 114A, the temperature may have dropped approximately 25° C. In other words, the temperature of the exhaust gases is at or near the representative operating range of the reducing catalytic converter 126, which as noted above, may be 200° to 400° C.

In fact, in some cases, the exhaust gas temperatures may rise in the exhaust system due to exothermic chemical reactions. As such, the actual temperature values and ranges as provided herein should not be construed as limiting the scope of the embodiments of the present disclosure.

Inspection of FIG. 3 indicates that the operating range of the engine falls outside an acceptable range for effective soot removal of 500° C. to 600° C. Advantageously, as described in more detail below, skip fire engine control may be effectively used as a strategy to modulate and maintain the exhaust gas temperatures within the preferable steady-state operating range and the ranges for effective soot quantity removal and the building of the quantity of soot, as will be discussed below.

Skip Fire Control System

Figure 4:
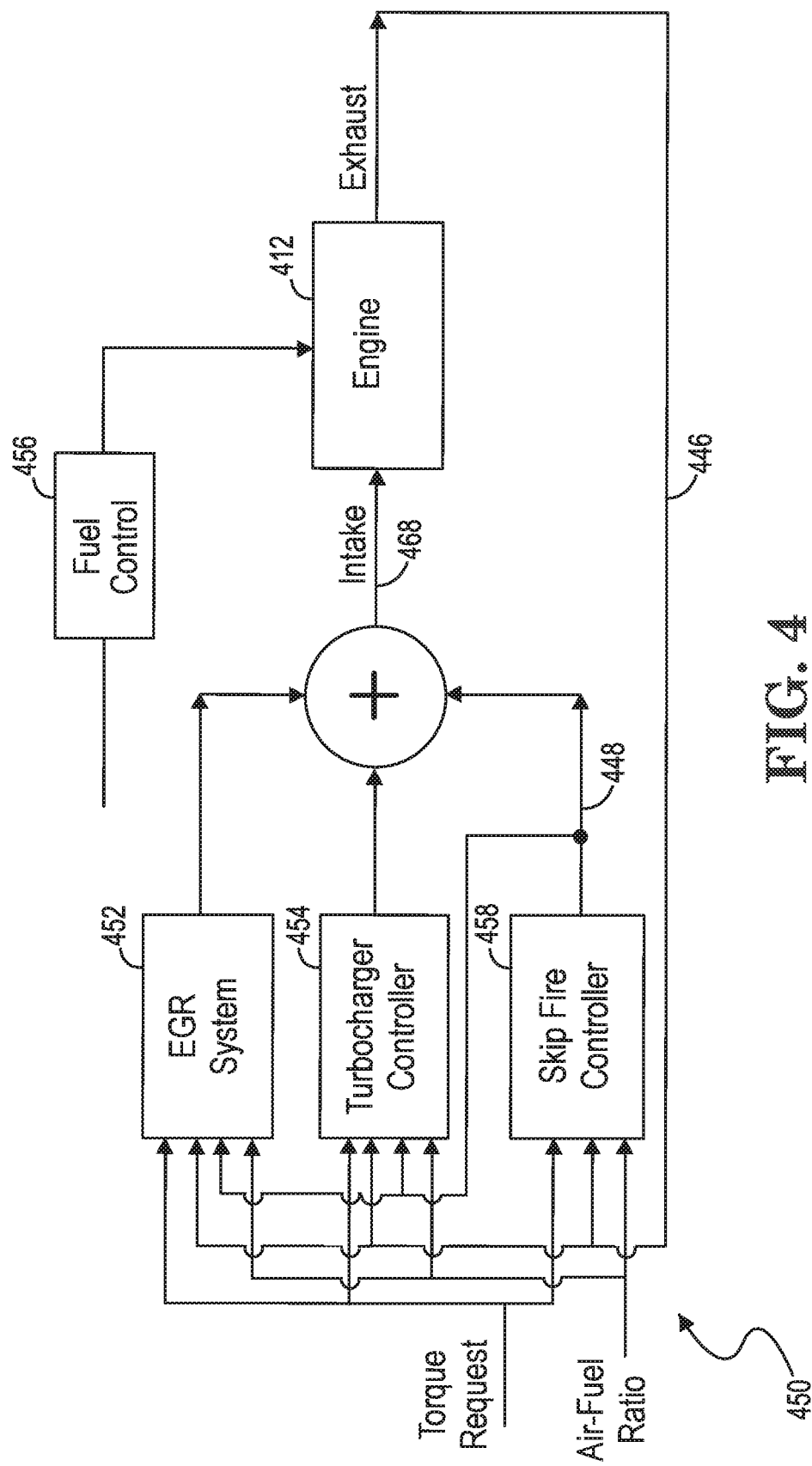
FIG. 4 is a schematic diagram of an engine controller for an internal combustion engine for use with embodiments of the present disclosure.

FIG. 4 is a schematic diagram of an engine controller for an internal combustion engine for use with embodiments of the present disclosure. Referring to FIG. 4, a schematic diagram of an engine controller 450 illustrating a number of controls and/or systems for controlling operation of the engine in a skip fire mode is illustrated. These control systems may include an Exhaust Gas Recirculation (EGR) system controller 452, a boost controller 454, a fuel control unit 456, and a skip fire controller 458.

The EGR system controller 452 is used in some engine types and operates to recirculate a portion of the exhaust as back to the cylinders of the engine. The recirculation tends to dilute the fresh air intake stream into the cylinder with gases inert to combustion.

The boost controller 454 controls the amount of compressed air that is inducted into the cylinders 116 of the engine 112. Boosting, that is supplying compressed air to the engine, allows generation of more power compared to a naturally aspirated engine since more air, and proportionally more fuel, can be input into the cylinders. The boost controller 454 may, for example, operate with a turbocharger, a supercharger, or a twincharger.

The fuel control unit 456 is used to determine the amount of fuel required by the cylinders of the engine. The amount of injected fuel is based primarily on the torque request. There must, however, be adequate air flow into the engine to combust the delivered fuel.

Many vehicles rely on a mass airflow sensor to determine the amount of air. Given the air flow into the engine and injected fuel mass, the air-fuel ratio, which is one of the inputs into engine controller 450 may be determined. Based on this value, the fuel control unit 456 makes a determination of how much fuel to inject into the cylinders of the engine. These controls can be helpful in determining how much soot is created over a number of engine combustion cycles.

The skip fire controller 458 is responsible for determining if the engine should operate in either a full displacement mode or in the skip fire mode. When no firing fraction value, other than 1, is adequate to meet a high torque demand, then the skip fire controller will operate the engine at full displacement. Otherwise, the engine is typically operated at one of multiple reduced effective displacements, each defined by a different firing density or fraction (e.g., firing fractions of ½, ¼, etc.), in the skip fire mode.

When in the skip fire mode, the skip fire controller 458 is responsible for determining a firing density or firing fraction that meets a current torque request. In other words, the skip fire controller 458 defines a firing fraction that is suitable to (1) meet the current torque request and (2) operate the vehicle at acceptable levels of Noise, Vibration, and Harshness (NVH). Satisfying these two constraints generally have the highest priority in the engine control architecture. (3) The skip fire process and selection of firing fractions can be beneficial, for example, in determining the desired quantity of soot that is maintained in the particulate filter, based on the number of firing cylinders and the number of no-firing cylinders that are open and/or closed.

Other parameters that may also be optimized are (4) fuel efficiency, (5) exhaust gas temperature, and (6) air/fuel ratio. Point (4) needs no explanation, since it is clearly advantageous to minimize fuel consumption. Points (5) and (6) stem from a desire to reduce the burden on aftertreatment elements in the exhaust system and to improve tailpipe emissions. Points (4) and (5) can also be utilized in soot quantity management as described herein. As driving conditions change and the engine speed and torque demand change, the skip fire controller 458 is responsible for selecting different firing fractions, each indicative of different reduced effective displacements less than the full displacement of the engine, that best meets the five objectives (1) through (6) articulated above.

The skip fire controller 458 receives several inputs, that can, for example, include (a) a current torque request, (b) a signal 446 indicative of the temperature of the exhaust gases in the aftertreatment system, (c) pressure data from modeling or from one or more sensors at the particulate filter, and (d) an air-fuel ratio of one or more active cylinders of the engine. In response, the skip fire controller 458 generates a firing density or fraction. With such inputs, the skip fire controller 458 is able to provide ever finer control of the engine, selecting an optimum firing density that best meets one or more of the objectives (1-6) mentioned above.

The outputs 448 from the skip fire controller 458, the boost controller 454, and the EGR controller 452 are then all considered to generate an air intake value 468, which is provided to the cylinders of the engine. In addition, as noted above, the fuel control unit 456 considers the air intake value 468 in providing an appropriate amount of fuel to the cylinders of the engine 412. The fuel and the air, together, define an air-fuel mixture provided to the cylinders, characterized by an air-fuel ratio. This air-fuel ratio can be used in soot creation and in maintaining the soot quantity in the particulate filter.

In some embodiments, the skip fire controller 458 is a dynamic skip fire controller. In other words, the skip fire controller 458 makes a decision to fire or not fire a given cylinder of an engine dynamically, meaning on a firing opportunity-by-firing opportunity basis.

Figure 5:
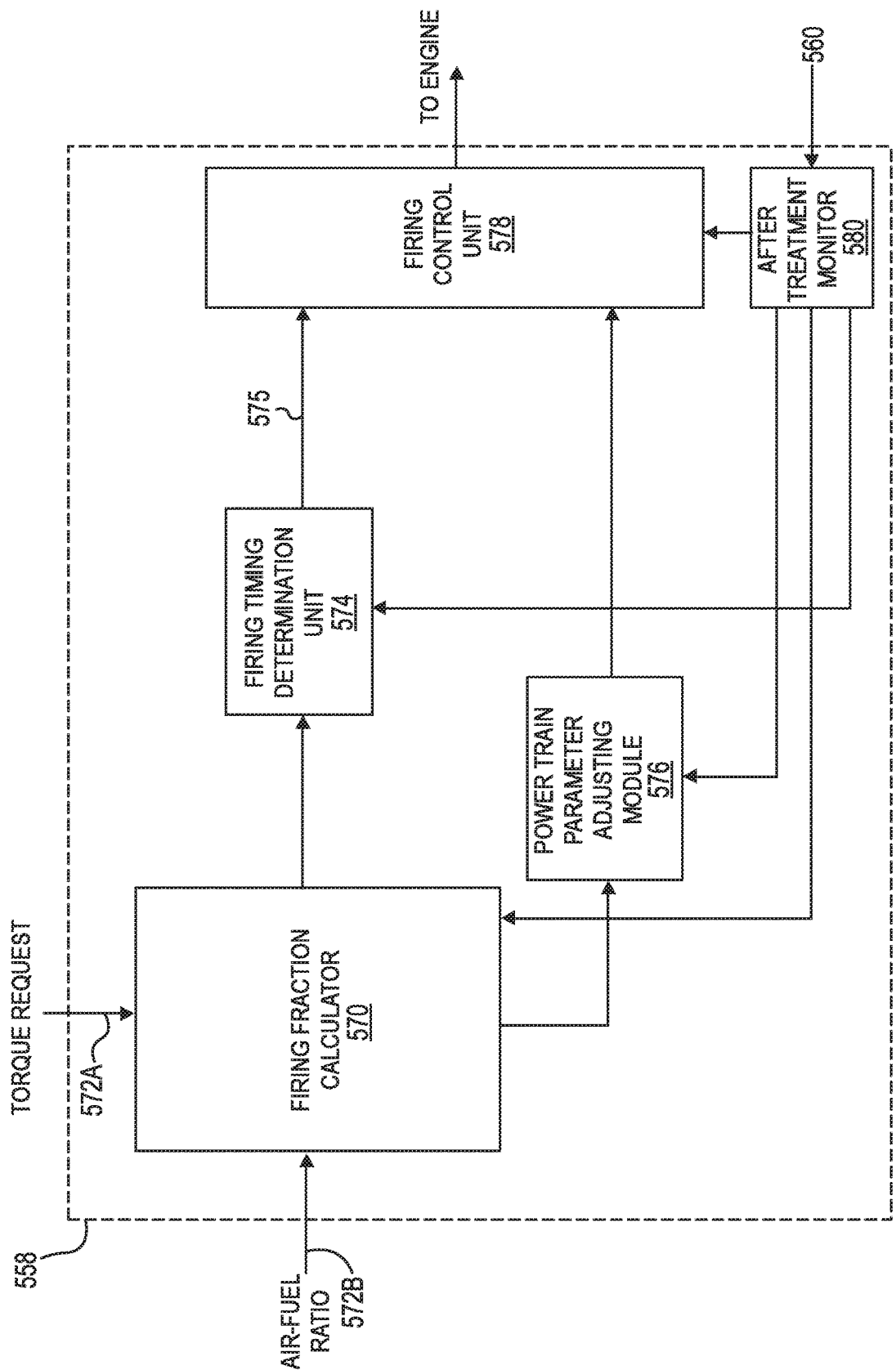
FIG. 5 is a logic diagram of a skip fire controller arranged to operate an internal combustion engine that can be used with embodiments of the present disclosure.

FIG. 5 is a logic diagram of a skip fire controller arranged to operate an internal combustion engine that can be used with embodiments of the present disclosure. In this example the skip fire controller 558 (458 of FIG. 4) includes a firing fraction calculator 570, a firing timing determination unit 574, a power train parameter adjusting module 576, a firing control unit 578, and an aftertreatment monitor 580.

The firing fraction calculator 570 receives three inputs including (a) a current torque request 572A, (b) a temperature of the exhaust gases as provided by the aftertreatment monitor 580, which receives signal 560 (indicative of the temperature of the exhaust gases at the aftertreatment device), and (c) an air-fuel ratio 572B. In response, the firing fraction calculator 570 determines a skip fire firing fraction or firing density that best matches one or more of the five objectives (1-6) noted above.

It should be appreciated that a firing fraction or density may be conveyed or represented in a wide variety of ways. For example, the firing fraction or density may take the form of a firing pattern, sequence, or any other firing characteristic that involves or inherently conveys the aforementioned percentage or density of firings.

In yet other embodiments, the firing fraction calculator 570 may take into account other information in determining the firing density. Such other information may include, for example, oxygen sensor data, $NO_x$ sensor data, ambient air temperature, exhaust gas temperature, catalyst temperature, barometric pressure, particulate filter soot quantity, particulate filter pressure, ambient humidity, engine coolant temperature, etc. In various embodiments, as these parameters change with the passage of time, the firing fraction may be dynamically adjusted in response to the changes.

The aftertreatment monitor 580 represents any suitable module, mechanism, and/or sensor(s) that obtain data relating to a characteristic of an aftertreatment element. Referring to the system of FIG. 1A, if the reducing catalytic converter 126 has the narrowest operating range of any aftertreatment element, only data representative of its temperature may be used. Alternatively, the aftertreatment temperature may correspond to the temperature of any or all of the particulate filter 120, oxidizing catalytic converter 122, and/or reducing catalytic converter 126 (see FIGS. 1A and 1B).

In various embodiments, for example, the aftertreatment monitor 580 may include or work in cooperation with oxygen sensor data from oxygen sensors in the aftertreatment system and $NO_x$ sensors placed before and after the reducing catalytic converter. Aftertreatment monitor 580 may also include such inputs as ambient air temperature, exhaust gas temperature in the exhaust manifold, pressure related to the particulate filter, ambient humidity, and/or engine coolant temperature.

In some embodiments, the skip fire controller 558 and the aftertreatment monitor 580 do not require a direct measurement or sensing of the temperature of an aftertreatment element. Instead, an algorithm using one or more inputs, such as a catalytic converter temperature model, may be used to estimate the exhaust gas temperature, aftertreatment element temperature, or system temperature. The model may be based on one or more of the above parameters (e.g., oxygen sensor data, $NO_x$ sensor data, exhaust gas temperature, catalyst temperature, barometric pressure, ambient humidity, engine coolant temperature, ambient temperature, barometric pressure, ambient humidity, etc.) that are representative or related to an aftertreatment element temperature.

The firing timing determination unit 574 receives input from the firing fraction calculator 570 and/or the power train parameter adjusting module 576 and is arranged to issue a sequence of firing commands (e.g., drive pulse signal) that are provided to the firing control unit 578. The firing timing determination unit 574 may take a wide variety of different forms. For example, in some embodiments, the firing timing determination unit 574 may utilize various types of lookup tables to implement the desired control algorithms.

In other embodiments, a sigma delta converter or other mechanisms are used. The sequence of firing commands (sometimes referred to as a drive pulse signal 575) are provided to the firing control unit 578, which orchestrates the actual firings of the cylinders of the engine.

The power train parameter adjusting module 576 directs the firing control unit 578 to set selected power train parameters appropriately to ensure that the actual engine output substantially equals the requested engine output at the commanded firing fraction or density. By way of example, the power train parameter adjusting module 576 may be responsible for determining the desired fueling level, number of fuel injection events, fuel injection timing, exhaust gas recirculation (EGR) level, and/or other engine settings that are desirable to help ensure that the actual engine output matches the requested engine output.

The firing control unit 578 receives input from the firing timing determination unit 572 and the power train parameter adjusting module 576. Based on the aforementioned inputs, the firing control unit 578 directs the engine to operate in the firing sequence 575 determined by the firing timing determination unit 574 with the engine parameters determined by the power train parameter adjusting module 576.

In order to accurately control the air-fuel ratio in a firing cylinder, the inducted mass air charge (MAC) must be accurately estimated. As disclosed in U.S. Pat. No. 9,945,313 and U.S. patent application Ser. No. 15/628,309, both of which are incorporated by reference herein in their entirety for all purposes, determination of inducted air mass is more complex in skip fire controlled engines than in engines operating at a fixed displacement. Adjustments to the cylinder MAC may be made based on a firing history of the cylinder and on an engine skip-fire sequence preceding firing of the cylinder.

A cylinder that was skipped on one or more prior working cycles will have cooler cylinder walls than if it had been fired. The greatest impact on cylinder wall temperature is from the immediately prior working cycle, but the cylinder firing history for approximately the past five firing opportunities will influence cylinder wall temperature. Additionally, the composition of residual gases in the cylinder may be different if the preceding firing opportunity was a skip rather than a fire. These changes in the initial conditions at the onset of combustion can impact combustion dynamics. To adjust for the different initial combustion conditions, the timing and pattern of fuel injection may be optimized based on the firing history of the cylinder. The desired air-fuel ratio may also be optimized. Adjusting fuel injection timing, fuel injection pattern, and/or air-fuel ratio may reduce undesirable combustion byproducts and increase fuel efficiency in the fired cylinder.

By way of example, some suitable firing fraction calculators, firing timing determination units, power train parameter adjusting modules and other associated modules are described in co-assigned U.S. Pat. Nos. 7,954,474; 7,886,715; 7,849,835; 7,577,511; 8,099,224; 8,131,445; 8,131,447; 9,086,020; and 9,120,478: U.S. patent application Ser. Nos. 13/774,134; 13/963,686; 13/953,615; 13/886,107; 13/963,759; 13/963,819; 13/961,701; 13/843,567; 13/794,157; 13/842,234; 13/004,839, 13/654,244 and 13/004,844, each of which is incorporated herein by reference in its entirety for all purposes.

With the use of air-fuel ratio, particulate filter soot quantity data, and exhaust temperature as inputs to the skip fire controller, an appropriate firing density can be selected for one or more of a desired torque output, air-fuel ratio, particulate filter soot quantity, and exhaust gas temperature. Based on these alternate considerations, the selected firing density may or may not be optimal for fuel consumption. However, in certain circumstances, achieving low tailpipe emissions to meet regulatory requirements is more important than the absolute highest fuel efficiency.

And, in some such considerations, these two factors (emissions and fuel efficiency) can be weighed with respect to each other to determine the proper engine configuration to achieve satisfactory results in both emissions and fuel efficiency categories. For example, a regulating entity may have requirements for both emissions and fuel efficiency and the engine controller can adjust the above parameter until the engine satisfies both, the emission and efficiency requirements either by trading some improvement in one for an improvement in the other or by maximizing the two to get the maximum combined gain or the most gain in the requirement most desired.

Figure 6:
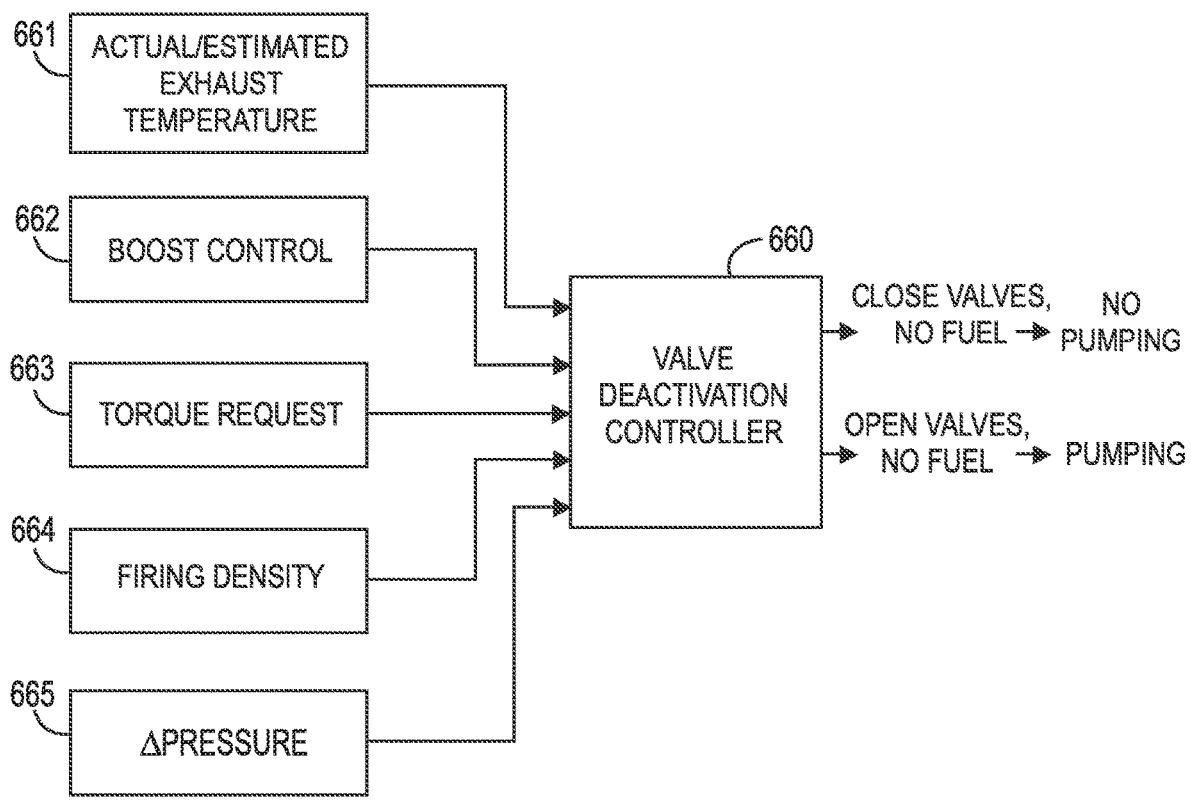
FIG. 6 is a schematic block diagram for a valve deactivation controller that may be used with embodiments of the present disclosure.

Referring to FIG. 6, a schematic block diagram for a valve deactivation controller 660 is shown. In various embodiments, the valve activation controller 660 may be included in or separate from the skip fire controller.

The valve deactivation controller 660 receives an input 661 indicative of the actual and/or an estimate of the exhaust temperature in the aftertreatment system, an input 662 indicative of the amount of compressed air that is forced into the cylinders by a turbocharger (or some other type of boost system), the current torque request 663, an input 664 indicative of the firing density as determined by the skip fire controller, and/or particulate filter soot quantity data (e.g., particulate filter pressure data 665). In response, the valve deactivation controller 660 makes a decision for the skipped cylinders to either:

(1) prevent pumping by closing either the intake and/or exhaust valves of the skipped cylinder; or (2) allowing air to be pumped through a deactivated cylinder by opening both the intake and exhaust valves. Since no fuel is provided to the cylinder, no combustion occurs, and intake air is pumped into the aftertreatment system.

Figure 7:
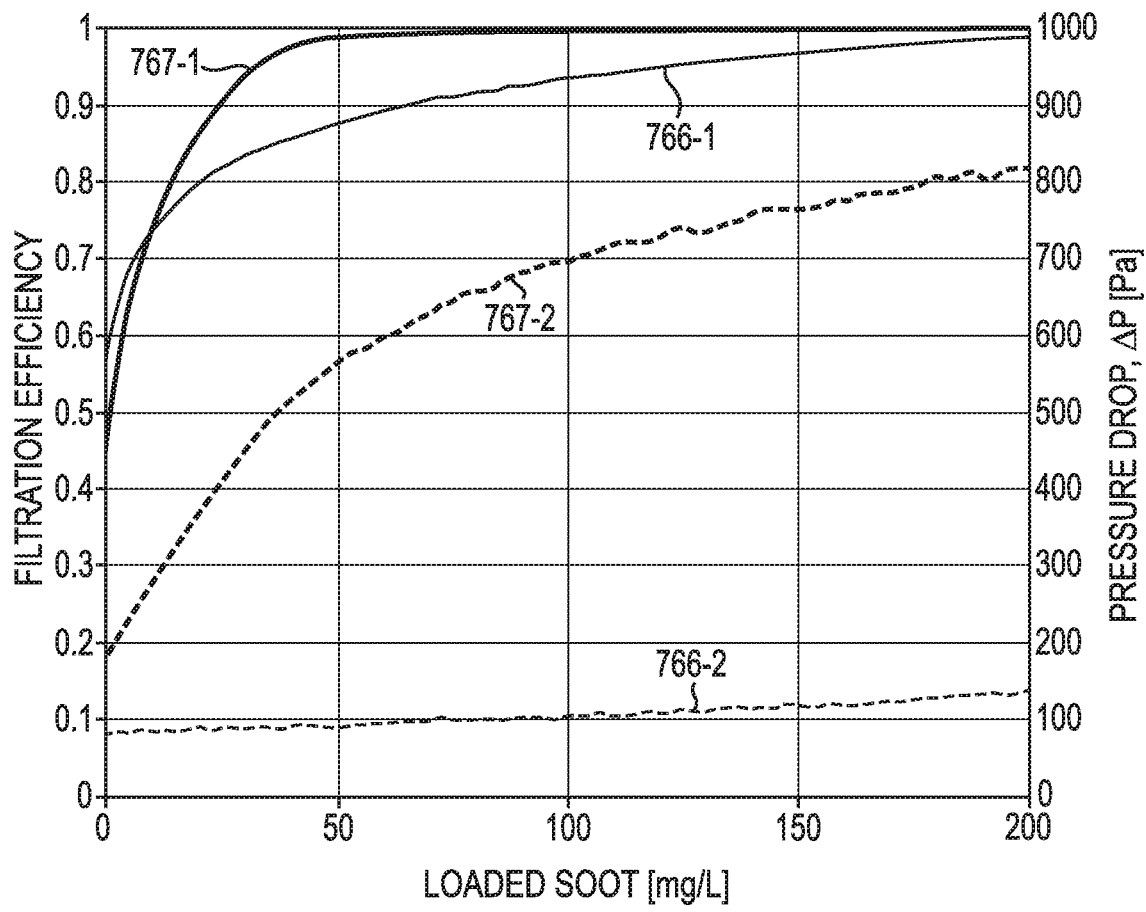
FIG. 7 is a plot of soot loading, filtering efficiency, and pressure at a particulate filter for an example internal combustion engine that can be used with embodiments of the present disclosure.

FIG. 7 is a plot of soot loading, filtering efficiency, and pressure drop of a particulate filter for an example internal combustion engine that can be used with embodiments of the present disclosure. As discussed above, FIG. 7 illustrates how the quantity of soot ("loaded soot" in FIG. 7), the soot trapping efficiency of the filter (a standard filter 766-1 and a filter with a wash coat 767-1), and the pressure across a particulate filter (a standard filter 766-2 and a filter with a wash coat 767-2) are related.

Specifically, as shown in FIG. 7, as the quantity of soot in the filter increases, so does the trapping efficiency of the filter (i.e., the filter's ability to capture particulate) and the pressure drop across the system. FIG. 7 also illustrates that the pressure drop across a standard filter does not change a lot as the soot load changes, while the pressure drop changes substantially as soot load increases in the wash coated filter. With both types of filters, however, the filtering efficiency is fairly similar between the two types of filters.

In this manner, it may be preferable to use a standard, non-wash coated filter, as the filtering efficiency is similar but has much lower pressure drop. Further, it should be noted that a standard filter can be loaded with 200 mg/L and have better filtering efficiency and lower pressure drop than a wash coated filter that has no soot loading.

Accordingly, embodiments of the present disclosure can evaluate these criteria with respect to each other for one filter type and, based on the desired outcome (i.e., better fuel efficiency vs. better emissions), determine how much quantity of soot in the particulate filter should be maintained. Based on that analysis, an engine management plan can be determined and implemented by engine control software of the engine controller.

Figure 8:
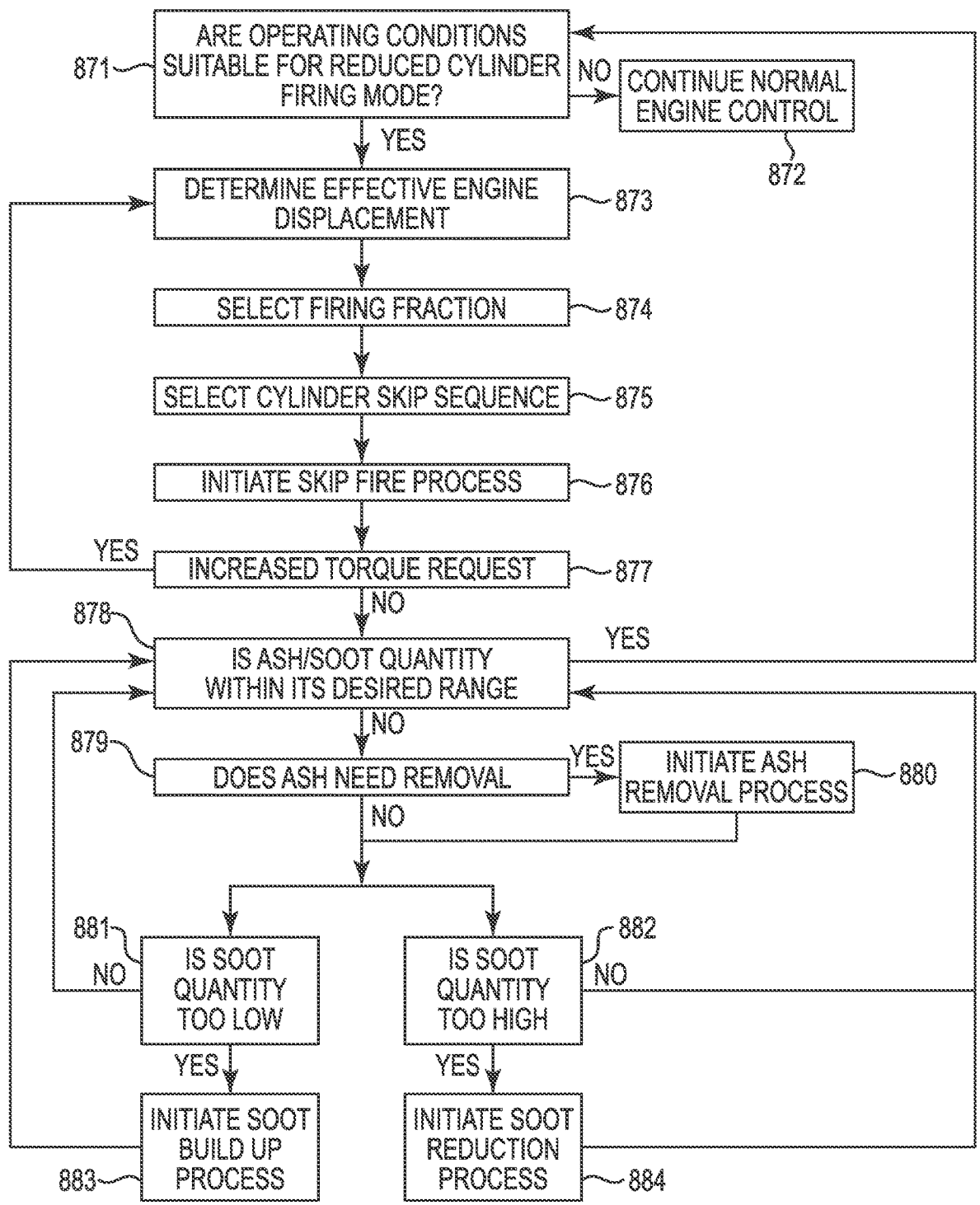
FIG. 8 is a flow diagram that illustrates engine decisions regarding skip fire, torque demand, and soot and ash management according to embodiments of the present disclosure.

FIG. 8 is a flow diagram that illustrates engine decisions regarding skip fire, torque demand, and soot and ash management according to embodiments of the present disclosure. The process determines whether operating conditions are suitable for a reduced cylinder firing mode, at block 871. If the conditions are not suitable, then the engine continues under normal engine control (full cylinder firing mode), as indicated at block 872.

If the conditions are suitable, then an effective engine displacement is determined, at block 873. An effective engine displacement satisfies the current engine demands that the engine controller is aware of. In doing so, a firing fraction is also determined, at block 874.

If skip fire is utilized, then the cylinder skip fire sequence is determined and, if a cylinder is skipped, whether the valves are opened or closed is determined, at block 875. Then, the skip fire process is initiated, at block 876.

If it is time to check the soot/ash quantity, then the system checks to see if a request for increased torque has been received, at block 877. If a request has been received, then the flow returns to block 873 to determine the correct effective engine displacement based on the torque requested.

If a request has not been received, then the system checks to see whether the soot/ash quantity is within the desired range, at block 878. If the quantity is within the desired range, then the process reverts to block 871 and the process begins again. If the quantity is not within the desired range, then the system checks to see if ash needs removal, at block 879.

If it determines that ash needs removal, then an ash removal process is initiated, at block 880. If ash does not need removal, then the soot quantity is checked to see if the soot quantity is too low, at block 881 or too high, at block 882.

If it is too low, then a soot build up process may be initiated, at block 883. And, if it is too high, then a soot reduction process is initiated, at block 884.

Once these processes are complete, the flow reverts to block 878 to determine if the soot/ash quantity is within the desired range. If it is not in the desired range, it continues to progress through the ash/soot process blocks 879-884. If the soot/ash quantity is in the desired range, then the process reverts to block 871 and the process begins again. As discussed herein, the above process is one way in which embodiments of the present disclosure can adjust and manage soot quantity. Another process can use DFCO and DCCO to adjust and manage soot quantity and is discussed below.

With respect to the use of DFCO and DCCO for soot management, as discussed above, DFCO allows soot to be burned off of the particulate filter, while DCCO allows the soot quantity to be maintained, and the operation of the engine under certain conditions allows for soot to be produced and to build up in the particulate filter.

Once a desired soot quantity range is determined (e.g., based on the parameters described herein), then the soot quantity present in the filter can be ascertained (e.g., from sensor data, from modeling, or a combination of the two), and based on those pieces of information, an engine control plan can be determined to build or reduce the soot quantity to get it within the range, if necessary, and then to maintain it within that range based, for example, on one or more of: changes to injection timing, changes to fuel-air ratio, changes in oxygen concentration in the exhaust gas, or changes in exhaust gas temperature.

Typically, if a soot quantity is within the desired range, over time during normal engine operation, soot will be produced during the combustion process and will continue to accumulate in the particulate filter, eventually putting the soot quantity above the desired range. When the system ascertains that the soot quantity is too high (e.g., based on sensor data, modeling, or a combination of the two), it can use the next deceleration opportunity to put the system in DFCO mode which will burn off soot.

The system can calculate the period of time the engine needs to be in DFCO mode. This calculation can be determined, for example, from a predicted burn rate which can, for instance, be based on sensor data (e.g., pressure data at the particulate filter), modeling, or a combination of the two. Once the soot quantity is within the desired range, the system can switch to DCCO and the soot quantity can be maintained until the end of the deceleration event. In some embodiments, this process can span multiple deceleration events if the soot quantity is not within the desired range at the end of the deceleration event.

If the soot quantity is below the desired range, then during a deceleration event, the system would only use DCCO. In this way, the current soot quantity is maintained during the deceleration event and the soot quantity will continue to build after the deceleration event (i.e., during normal engine operation). Alternatively, as discussed above, the engine can be adjusted to create more soot than under normal engine operation, if building soot quickly is desired.

In another embodiment, in some cases (e.g., where there is substantial soot quantity built up in the particulate filter), instead of switching to full DFCO, which has a firing fraction of 0 (all cylinders are pumping air and not firing), the system can switch to a higher firing fraction that is less than 1, such as ½ (where only two cylinders of a four cylinder engine are pumping air). This can create a burn off event, but the burn rate will be slower as there is not as much oxygen and the exhaust flow is not as slow as during full DFCO. This may provide some of the benefits of DFCO while reducing the potential for filter damage due to potentially high temperatures that could be generated during a full DFCO process.

Accordingly, the embodiments of the presented disclosure provide a number of benefits with regard to soot and ash management in combustion engines. For example, embodiments can determine and maintain a soot quantity within desired range, which can allow the engine to be adjusted for improved fuel efficiency and emissions restrictions, among other benefits.

Not only can this allow for better filtration of particulate, generally, but this ability to adjust the soot quantity, thereby dynamically changing the filtering efficiency allow for selecting an acceptable tradeoff between fuel economy/engine performance and acceptable emissions values. This could allow for a vehicle to have different "eco" modes where one mode maximizes fuel economy and another mode focuses on lowest emissions values. In such an embodiment, the engine controller could have various sets of instructions that could be executed to change the characteristics of the engine regarding the soot quantity management and can switch to those different instructions based on the selection of a particular "eco" mode.

Another benefit is that less expensive filters can be used as the soot can add to a less expensive filter's particle trapping efficiency. For example, a particulate filter without a wash coat could be used, which is less expensive and requires fewer manufacturing steps. Furthermore, a smaller volume particulate filter can be employed where the exhaust gas moves through the filter more quickly which results in lower filtration efficiency, the lower filtration efficiency of the bare filter would be complemented by the added filtration of the soot cake.

Provided below are some example method, apparatus, and controller embodiments of the present disclosure. In a first embodiment, a method for particulate filter soot management for internal combustion engines includes: determining a quantity of soot on a particulate filter and adjusting a skip fire firing sequence based at least in part on maintaining the quantity of soot on the particulate filter within a desired soot quantity range.

Method embodiments can further include wherein the quantity of soot is adjusted by controlling a temperature of exhaust gas of the internal combustion engine. The quantity of soot can be adjusted by controlling an oxygen level in the exhaust gas of the internal combustion engine.

Methods can include: wherein the quantity of soot is adjusted by controlling both an oxygen level in the exhaust gas of the internal combustion engine and a temperature of exhaust gas of the internal combustion engine.

In some embodiments an engine controller, for operating an internal combustion engine including a plurality of working chambers with at least one working chamber having a deactivatable intake and/or exhaust valve, the engine controller includes:

a firing fraction selector arranged to select a firing fraction from a plurality of firing fractions for operating the engine in a skip fire manner, each of the firing fractions defining a different effective engine displacement that is each less than full displacement of the engine; and a firing timing determination unit that is arranged to determine a firing sequence for operating at least one working chamber of the engine having a deactivatable intake and/or exhaust valve in the skip fire manner in accordance with the selected firing fraction, wherein the firing sequence is generated based on an estimated quantity of soot in a particulate filter (PF).

Engine controller embodiments can include wherein the estimated quantity of soot is sensed based on a pressure value sensed from within an aftertreatment chamber that contains the PF. In some embodiments, for a given effective engine displacement corresponding to the selected firing fraction, the firing sequence for operating the at least one working chamber is determined on a firing opportunity by firing opportunity basis such that a selection of which working cycles to either fire or skip is individually made each firing opportunity in accordance with the selected firing fraction. The engine controller can also be configured to selectively direct at least one of an associated intake valve or exhaust valve to be deactivated during each skipped working cycle such that air is not pumped through the working chamber into the engine exhaust system.

Another method embodiment includes a method for particulate filter soot management for internal combustion engine:

receiving pressure data from within an aftertreatment chamber of an exhaust system connected to an internal combustion engine, the aftertreatment chamber having a particulate filter (PF) therein where the exhaust gas from the engine passes through the PF and, as the exhaust gas passes through the PF, soot particles within the exhaust gas are deposited on a surface of the PF;

determining a quantity of soot on a particulate filter; and adjusting a skip fire firing sequence based at least in part on maintaining the quantity of soot within a desired soot quantity range.

The method can also include wherein the determined firing sequence includes a part of the sequence where the exhaust gas temperature is temporarily elevated to reduce the quantity of soot on the PF over a period of time. In some embodiments, during selected skipped working cycles, the corresponding working chambers are deactivated such that no air is pumped through the corresponding working chamber during skipped working cycles.

In some methods, the decisions to skip or fire each working chamber working cycle are made individually at every firing opportunity during skip fire operation of the engine. Methods can also include wherein the determined firing sequence includes a part of the sequence where the exhaust gas temperature is temporarily reduced to build up the quantity of soot on the PF over a period of time.

The method can include depositing ash material on the quantity of soot in the PF and elevating the exhaust air temperature to remove at least part of the quantity of soot in the PF to cause at least some of the ash material deposited on the quantity of soot to be pushed to an end of the PF. Additionally, methods can include controlling the quantity of soot in the PF allowing ash material to be pushed to an end of the PF during soot regeneration. The determined firing sequence can include a part of the sequence where the exhaust air temperature is temporarily elevated to completely remove the quantity of soot in the PF over a first period of time to allow a new quantity of soot to build up when the exhaust air temperature is reduced over a second period of time that is subsequent the first period of time, in some methods.

An example of an apparatus embodiment includes: an exhaust sensor for monitoring an operating temperature of exhaust gas in an aftertreatment chamber of an exhaust system for an internal combustion engine;

an engine controller for controlling the operation of the internal combustion engine, the engine controller configured to receive:

a torque signal indicative of a requested torque demand for the internal combustion engine; and the engine controller further including a firing fraction calculator configured to define one or more firing fractions, each defining a different effective reduced displacement that is less than full displacement of the internal combustion engine, the engine controller further configured to control the firing of the cylinders of the engine in a skip fire manner while operating at a selected reduced effective displacement using a corresponding one of the one or more firing fractions;

wherein the skip fire control causes the internal combustion engine to adjust to:

meet varying torque demands as indicated by changes in the torque signal; and regulate the temperature of the exhaust gas to within a predefined temperature range to maintain a particulate filter (PF) efficiency within a range of efficiency values by altering a quantity of soot loading on a surface of the PF.

Some apparatus embodiments include wherein the engine controller is further configured to prevent air from passing through one or more cylinders of the internal combustion engine during skipped firing opportunities of the one or more cylinders respectively, the prevention of the air passing through the one or more cylinders into the exhaust system acting to increase the operating temperature of the exhaust air and thereby allowing for the reduction of the quantity of soot in the particulate filter.

The engine controller can be further configured to allow air into the exhaust system by opening intake valve(s) and exhaust valve(s), while preventing combustion, for the one or more cylinders respectively, the air allowed into the exhaust system acting to decrease the operating temperature of the exhaust gas and thereby allowing the quantity of soot to build up. In some embodiments, the engine controller is further configured to inject and allow fuel to pass through one or more cylinders, substantially without combustion, so that the passed fuel is ignited in the exhaust system, the ignited fuel increasing the operating temperature of the exhaust gas and burning off part of the quantity of soot in the PF.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for particulate filter soot management for an internal combustion engine, the method comprising:
   determining a desired soot quantity range for a particulate filter;
   determining a current quantity of soot on the particulate filter; and
   adjusting a skip fire firing sequence used by the internal combustion engine having multiple cylinders with valves and an exhaust system connected to the engine, wherein the skip firing sequence includes a Deceleration Fuel Cut Off mode wherein the Deceleration Fuel Cut Off interrupts supply of fuel to all of the cylinders of the engine when a vehicle into which the engine is placed is decelerating, wherein the Deceleration Fuel Cut Off mode is changed to a Deceleration Cylinder Cut Off mode, wherein in Deceleration Cylinder Cut Off mode the cylinders of the engine are cut off meaning that the valves are closed and no fuel is injected into the cylinders to be combusted and no air is passed through the cylinders into the exhaust system during the skip fire firing sequence based at least in part on maintaining the quantity of soot within the desired soot quantity range.

2. The method as recited in claim 1, wherein the quantity of soot is adjusted by controlling a temperature of exhaust gas of the internal combustion engine.

3. The method as recited in claim 1, wherein the quantity of soot is adjusted by controlling an oxygen level in exhaust gas of the internal combustion engine.

4. The method as recited in claim 1, wherein the quantity of soot is adjusted by controlling both an oxygen level in exhaust gas of the internal combustion engine and a temperature of the exhaust gas of the internal combustion engine.

5. A method for particulate filter soot management for internal combustion engines, the method comprising:
   receiving pressure data from within an aftertreatment chamber of an exhaust system connected to an internal combustion engine, the aftertreatment chamber having a particulate filter (PF) therein where exhaust gas from the engine passes through the PF and, as the exhaust gas passes through the PF, soot particles within the exhaust gas are deposited on a surface of the PF;
   determining a desired soot quantity range for the PF
   determining a current quantity of soot on the PF; and
   adjusting a skip fire firing sequence used by the internal combustion engine having multiple cylinders with valves and an exhaust system connected to the engine, wherein the skip firing sequence includes a Deceleration Fuel Cut Off mode wherein the Deceleration Fuel Cut Off interrupts supply of fuel to all of the cylinders of the engine when a vehicle into which the engine is placed is decelerating, wherein the Deceleration Fuel Cut Off mode is changed to a Deceleration Cylinder Cut Off mode, wherein in Deceleration Cylinder Cut Off mode the cylinders of the engine are cut off meaning that the valves are closed and no fuel is injected into the cylinders to be combusted and no air is passed through the cylinders into the exhaust system during the skip fire firing sequence based at least in part on maintaining the quantity of soot within the desired soot quantity range.

6. The method as recited in claim 5, wherein the adjusted skip fire firing sequence includes a part of a sequence where exhaust gas temperature is temporarily elevated to reduce the quantity of soot on the PF over a period of time.

7. The method as recited in claim 5, wherein during selected skipped working cycles, corresponding working chambers are deactivated such that no air is pumped through the corresponding working chamber during skipped working cycles.

8. The method as recited in claim 5, wherein the internal combustion engine has a number of working chamber working cycles and wherein decisions to skip or fire each working chamber working cycle are made individually at every firing opportunity during skip fire operation of the engine.

9. The method as recited in claim 5, wherein the adjusted skip fire firing sequence includes a part of a sequence where exhaust gas temperature is temporarily reduced to build up the quantity of soot on the PF over a period of time.

10. The method as recited in claim 9, wherein the method includes depositing ash material on the quantity of soot in the PF and elevating exhaust air temperature to remove at least part of the quantity of soot in the PF to cause at least some of the ash material deposited on the quantity of soot to be pushed to an end of the PF.

11. The method as recited in claim 9, wherein the method includes controlling the quantity of soot in the PF, which allows ash material to be pushed to an end of the PF during soot regeneration.

12. The method as recited in claim 5, wherein the adjusted skip fire firing sequence includes a part of a sequence where exhaust air temperature is temporarily elevated to completely remove the quantity of soot in the PF over a first period of time to allow a new quantity of soot to build up when the exhaust air temperature is reduced over a second period of time that is subsequent the first period of time.

* * * * *